3,338,976
BIS[α-(SUBSTITUTED PHENYLTHIO)-p-TOLYL]
ETHERS
Lawrence F. Sonnabend, Midland, Mich., assignor to The
Dow Chemical Company, Midland, Mich., a corporation of Delaware
No Drawing. Filed July 6, 1965, Ser. No. 469,898
5 Claims. (Cl. 260—609)

The present invention is directed to bis[α-(substituted phenylthio)-p-tolyl] ethers having the formula

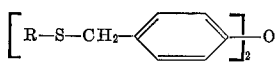

In this and succeeding formulae, R represents a member of the group consisting of phenyl, halophenyl, tolyl and cumenyl. In the present specification and claims, the halo refers to chlorine and bromine. The compounds of the present invention are liquids or solids which are of low solubility in water and of moderate solubility in many organic liquids. These crystalline solid materials have been found to be useful as pesticides for the control of worm, fungal, bacterial and insect organisms such as cockroaches, *Erysiphe cichovacearum*, peas, sorgum, *Edwinia amylovora*, Japanese millet, rootknot nematodes, *Bacillus cereus* and poultry enteric disease.

The compounds of the present reaction are prepared by reacting together a p,p'-bis(dihalomethyl)diphenyl oxide and a substituted thiophenol having the formula

The reaction can be conveniently carried out in excess of the thiophenol reactant, wherein the excess thiophenol serves as reaction medium. In an alternate procedure, the reaction can be conveniently carried out in the presence of an inert organic solvent as reaction medium. The reaction proceeds smoothly at temperatures at which the desired product and hydrogen chloride of reaction are formed. Ordinarily, the reaction proceeds readily at temperatures between 50 and 200° C. and preferably at temperatures between 80 and 150° C. The amounts of the reactants to be employed are not critical, some of the desired product being formed when employing the reactant in any proportions. However, the reaction consumes two moles of the substituted thiophenol compound for each mole of the dihalomethyl diphenyl oxide and use of the reactants in such proportions is preferred.

In carrying out the reaction, the p,p'-bis(dihalomethyl)diphenyl oxide and substituted thiophenol are combined in any order or fashion. Representative inert organic solvents which can be employed as reaction media include benzene, toluene, xylene and cyclohexane. The reaction mixture is elevated to and maintained at the reaction temperature until there is a substantial cessation in the formation of the hydrogen halide of reaction. Thereafter, the desired product is removed from the reaction medium by such conventional procedures as filtration or distillation of the low boiling constituents to yield a product as a solid residue. This residue can be employed in pesticidal applications or further purified by such conventional procedures as washing with an appropriate liquid or recrystallization from a suitable solvent before being employed in such applications.

The following examples are merely illustrative and are not intended to be limiting.

Bis(α-(phenylthio)-p-tolyl) ether p,p'-bis(dichloromethyl)diphenyl oxide (40 grams; 0.15 mole) was combined with thiophenol (166 grams; 0.66 mole). The resulting mixture was heated with stirring at 128–141° C. for 21 hours. Thereafter, the reaction mixture was distilled under reduced pressure to remove the unreacted thiophenol and leave the bis(α-(phenylthio)-p-tolyl) ether product as a solid residue. This residue was recrystallized from toluene and the recrystallized product found to melt at 111–112° C.

Bis[α-(p-bromophenylthio)p-tolyl] ether p,p'-Bis(chloromethyl)diphenyl oxide (40 grams; 0.15 mole) and p-bromothiophenol (57 grams; 0.30 mole) are dispersed with stirring in 300 milliliters of xylene. The resulting mixture is heated with stirring at 130° C. for about 30 hours. Following the reaction period, the reaction mixture is fractionally distilled under reduced pressure to remove the low boiling constituents and obtain the bis(α-(p-bromophenylthio)-p-tolyl) ether product as a crystalline residue. This residue is recrystallized from toluene and found to melt at 113.5–117° C.

In similar procedures, the following compounds of the present invention are prepared.

Bis[α-(2,3,5,6-tetrachlorophenylthio) - p - tolyl] ether (molecular weight 689.6) by reacting together 2,3,5,6-tetrachlorothiophenol and p,p'-bis(chloromethyl)diphenyl oxide.

Bis[α-(2,5-dibromophenylthio)-p-tolyl] ether (molecular weight 729.6) by reacting together 2,5-dichlorothiophenol and p,p'-bis(chloromethyl)diphenyl oxide.

Bis[α-(4-chlorophenylthio)-p-tolyl] ether (melting at 119–121° C.) by reacting together 4-chlorothiophenol and p,p'-bis(chloromethyl)diphenyl oxide.

Bis[α-(2,3-dichlorophenylthio)-p-tolyl] ether (molecular weight 551.8) by reacting 2,3-dichlorothiophenol and p,p'-bis(chloromethyl)diphenyl oxide.

Bis[α-(p-tolylthio) - p - tolyl] ether (molecular weight 442) by reacting p-tolylthiophenol and p,p'-bis(chloromethyl)diphenyl oxide.

Bis[α-(m-tolylthio)-p-tolyl] ether (refractive index $n_D^{25}$ of 1.6492) by reacting together p,p'-bis(chloromethyl)diphenyl oxide and m-tolylthiophenol.

Bis[α - (m - cumenylthio)-p-tolyl] ether (molecular weight 498) by reacting together m-cumenylthiophenol and p,p'-bis(chloromethyl)diphenyl oxide.

Bis[α-(o-cumenylthio)-p-tolyl] ether refractive index $n_D^{25}$ of 1.6218) by reacting together o-cumenylthiophenol and p,p'-bis(chloromethyl)diphenyl oxide.

Bis[α - (p - cumenylthio) - p-tolyl] ether (molecular weight 498) by reacting together p-cumenylthiophenol and p,p'-bis(chloromethyl)diphenyl oxide.

Bis[α-(o-tolylthio)-p-tolyl] ether (molecular weight 442) by reacting together o-tolylthiophenol and p,p'-bis(chloromethyl)diphenyl oxide.

Bis[α - (pentachlorophenylthio) - p-tolyl] ether (molecular weight 758.5) by reacting together pentachlorothiophenol and p,p'-bis(chloromethyl)diphenyl oxide.

The compounds of the present invention are useful as pesticides for the control of many fungal, bacterial and insect pests. For such use, the unmodified compounds can be used. Alternatively, the compounds can be adapted to be dispersed in or on various environments such as soil, plant parts, textiles, paper, wood, etc. In such adaptations the toxicant compound is dispersed on finely divided solids and the resulting preparation employed as a dust. Also, such preparations can be dispersed in water without the aid of a wetting agent and the resulting aqueous dispersions employed as sprays. In other procedures, the compound can be employed in oil or in other solvent, or as a constituent or solvent-in-water or water-in-solvent emulsions or as aqueous dispersions thereof which can be applied as a spray, drench or wash.

In representative operations, aqueous compositions containing bis[α-(4-bromophenylthio)-p-tolyl] ether at concentrations of 500 parts per million by weight give complete kills of *Edwinia amylovora* (bacterium fire blight) and *Bacillus cereus*. In further operations, aqueous compositions containing bis[α-(3-tolylthio)-p-tolyl] ether at a concentration of 5000 parts per million by weight give substantially complete kills of *Erysiphe cichovaceaum* (powdery mildew). In other operations, aqueous compositions containing bis[α-(4-chlorophenylthio)-p-tolyl] ether at concentrations of 100 pounds per acre give substantially complete kills of peas and sorgum.

I claim:

1. A compound corresponding to the formula 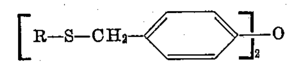 wherein R represents a member of the group consisting of phenyl, halophenyl wherein halo is chlorine or bromine, tolyl and cumenyl.

2. Bis[α-(4-bromophenylthio)-p-tolyl] ether.

3. Bis[α-(4-chlorophenylthio)-p-tolyl] ether.

4. Bis[α-(3-tolylthio)-p-tolyl] ether.

5. Bis[α-(2,5-dibromophenylthio)-p-tolyl] ether.

No references cited.

CHARLES B. PARKER, *Primary Examiner.*

DELBERT R. PHILLIPS, *Assistant Examiner.*